Patented Dec. 1, 1953

2,661,273

UNITED STATES PATENT OFFICE 2,661,273

HERBICIDAL COMPOSITIONS

Arthur H. Schlesinger, Dayton, Ohio, assignor to Monsanto Chemical Company, St. Louis, Mo., a corporation of Delaware No Drawing. Application August 19, 1952, Serial No. 305,309

7 Claims. (Cl. 71—2.3)

The present invention provides new and highly valuable herbicidal compositions and methods of destroying or preventing plant growth for which said compositions are employed.

I have found that improved and very efficient herbicidal compositions are obtained when there are prepared oil-in-water emulsions of p-cyclohexylphenyl alkyl ketones in which the alkyl radical has from 1 to 4 carbon atoms. Examples of ketones useful for the present purpose are p-cyclohexylacetophenone, p - cyclohexylpropiophenone, p-cyclohexylbutyrophenone, p-cyclohexylisobutyrophenone, and p-cyclohexylvalerophenone. The present ketones are readily obtainable, for example, by reaction of cyclohexylbenzene with an acyl halide or an acid anhydride in the presence of a Friedel-Crafts type catalyst.

Herbicidal compositions containing the present ketones may be readily obtained by first preparing a solution of the ketone in an organic solvent and then adding the resulting solution to water containing an emulsifying agent to form an emulsion. Because of the very high herbicidal efficiency of the p-cyclohexylphenyl alkyl ketones, they are present in the herbicidal compositions in only very small concentrations, for example, in concentrations of from 0.1 per cent to 2.0 per cent by weight of the total weight of the emulsion. Emulsifying agents which may be employed are those customarily used in the art for the preparation of oil-in-water emulsions. The word "oil" is here used to designate any organic liquid which is insoluble in water. Examples of emulsifying agents which may be used include alkylbenzenesulfonates, long - chained polyalkylene glycols, long-chained succinates, etc. The emulsions may be used to destroy already existing plant growth by direct application to the undesirable plants, e. g., by spraying; or the emulsions may be employed to prevent plant growth by application to media which normally support plant growth. When employed to prevent plant growth, for example, in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., soils, cinders, etc.

The oil-in-water emulsions of the present p-cyclohexylphenyl alkyl ketones are particularly valuable in that when applied to the leaves of broad-leafed plants they dry the leaves thereof. Application of some of the present herbicidal compositions to such plants as cotton, beans, and peas causes leaf-drying and thus permits more efficient harvesting or hand-picking of the bolls or pods.

The present invention is further illustrated, but not limited by the following examples:

Example 1

Spray testing of the present herbicidal compositions was conducted as follows:

A cyclohexanone solution of p-cyclohexylacetophenone together with an emulsifying agent was added to water, the quantity of solution employed being calculated to give respective emulsions containing 0.3 per cent and 1.0 per cent of the p-cyclohexylacetophenone based on the total weight of each emulsion. The quantity of emulsifying agent used was 0.2 per cent by weight, based on the total weight of each emulsion. Said emulsifying agent comprised a mixture of a polyalkyleneglycol derivative and an alkylbenzenesulfonate.

Three-week old corn and bean plants, respectively, were sprayed with the emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank specimens" of each plant were then allowed to remain under standard conditions of sunlight and watering for a period of one week. At the end of that time the sprayed plants were compared with the untreated plants in order to determine the extent of injury, if any. The following observations were made: Corn plants which had been treated with the 1.0 per cent emulsion of p-cyclohexylacetophenone were completely dead and the leaves thereof dried while those which had been treated with the 0.3 per cent emulsion suffered severe injury. A somewhat selective action of p-cyclohexylacetophenone was demonstrated in the bean tests. Bean plants which had been sprayed with the 1.0 per cent emulsion of the ketone were only moderately injured and those which had been treated with the 0.3 per cent emulsion showed only slight injury.

Example 2

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of rye grass, radish, beet, wheat, wild oats, cheat grass and cucumber seeds, respectively, were prepared. The surface soil of the seeded boxes was then sprayed, respectively, with the 1.0 per cent and the 0.3 per cent emulsions of p-cyclohexylacetophenone of Example 1. The quantity of each emulsion which was applied was calculated to correspond to either 20 lbs. of the ketone per acre or to 50 lbs. per acre. In the present instance, 10.8 cc. of the 0.3 per cent emulsion per 25 square inches of surface soil was calculated to correspond to 20 lbs. of the chemical per acre and 9.1 cc. of the 1.0 per cent emulsion to 50 lbs. of the chemical per acre. The sprayed boxes as well as similar seeded but unsprayed boxes were then maintained at standard conditions of temperature and watering for a period of two weeks. At the end of that time the number of healthy seedlings in each box was counted. Thus the number of non-emerging and damaged seedlings was obtained by difference. This difference is designated as "X." "Per cent phytotoxicity" was determined by the ratio of "X" to the number of healthy seedlings in the controls.

There was evidenced a 71–100 per cent phytotoxicity to the beet and rye grass at both the 50 lb. per acre rate and the 20 lb. per acre rate of application. A 71–100 per cent phytotoxicity to cucumber, cheat grass and wild oats was also demonstrated at the 50 lb. per acre rate. A phytotoxicity of 46–70 per cent to radishes and a phytotoxicity of less than 46 per cent to wheat was evidenced at the 50 lb. per acre rate.

While the present p-cyclohexylphenyl alkyl ketones are most advantageously employed as herbicides by incorporating them into aqueous emulsions as herein described, they may also be employed in other plant destroying methods. Thus they may be incorporated into solid carriers such as clay, talc, pumice and bentonite to give herbicidal compositions which may be applied to living plants or to surfaces which are to be freed from plant growth. The ketones may also be mixed with liquid or solid agricultural pesticides, e. g., insecticides and fungicides. While solutions of the compounds in organic solvents may be employed for preventing and destroying plant growth, we have found that the emulsions possess an improved tendency to adhere to the treated surfaces and that less of the active ingredient is required to give comparable herbicidal efficiency.

What I claim is:

1. A herbicidal composition comprising an oil-in-water emulsion of a p-cyclohexylphenyl alkyl ketone in which the alkyl radical has from 1 to 4 carbon atoms, said ketone being present in said emulsion in a quantity which is toxic to plant life.

2. A herbicidal composition comprising an oil-in-water emulsion of p-cyclohexylacetophenone, said p-cyclohexylacetophenone being present in said emulsion in a quantity which is toxic to plant life.

3. The method of destroying undesirable plants which comprises applying to said plants a toxic quantity of a herbicidal composition comprising a p-cyclohexylphenyl alkyl ketone in which the alkyl radical has from 1 to 4 carbon atoms.

4. The method of preventing plant growth which comprises applying to media normally supporting said growth a herbicidal composition comprising a p-cyclohexylphenyl alkyl ketone in which the alkyl radical has from 1 to 4 carbon atoms.

5. The method of destroying undesirable plants which comprises applying to said plants a toxic quantity of a herbicidal composition comprising an oil-in-water emulsion of a p-cyclohexylphenyl alkyl ketone in which the alkyl radical has from 1 to 4 carbon atoms.

6. The method of destroying undesirable plants which comprises applying to said plants a toxic quantity of a herbicidal composition comprising an oil-in-water emulsion of p-cyclohexylacetophenone.

7. The method of preventing plant growth which comprises applying to soils normally supporting said growth a herbicidal composition comprising an oil-in-water emulsion of p-cyclohexylacetophenone.

ARTHUR H. SCHLESINGER.

No references cited.